United States Patent
Steele, Jr. et al.

(10) Patent No.: US 8,330,430 B2
(45) Date of Patent: Dec. 11, 2012

(54) ALTERNATOR REGULATOR WITH VARIABLE ROTOR FIELD FREQUENCY

(75) Inventors: Robert R. Steele, Jr., Lapel, IN (US); Jack D. Harmon, Carmel, IN (US); Mingshe Zhou, Fishers, IN (US)

(73) Assignee: Remy Technologies, LLC, Pendleton, IN (US)

( * ) Notice: Subject to any disclaimer, the term of this patent is extended or adjusted under 35 U.S.C. 154(b) by 645 days.

(21) Appl. No.: 12/271,365

(22) Filed: Nov. 14, 2008

(65) Prior Publication Data
US 2010/0123439 A1 May 20, 2010

(51) Int. Cl.
*H02P 11/00* (2006.01)
*H02P 9/00* (2006.01)

(52) U.S. Cl. ............................. 322/24; 322/28

(58) Field of Classification Search .............. 322/24, 322/28, 44, 89; 363/17, 65; 307/10.1
See application file for complete search history.

(56) References Cited

U.S. PATENT DOCUMENTS

| | | | |
|---|---|---|---|
| 2,335,874 A * | 12/1943 | Moyer et al. | 363/175 |
| 4,388,587 A | 6/1983 | Lamoth et al. | |
| 5,691,590 A | 11/1997 | Kawai et al. | |
| 6,037,753 A | 3/2000 | Uematsu et al. | |
| 6,078,203 A | 6/2000 | Zafarana et al. | |
| RE37,609 E | 3/2002 | Bittner | |
| 6,483,277 B1 * | 11/2002 | Harmon | 322/28 |
| 6,570,289 B1 | 5/2003 | Liang et al. | |
| 6,639,391 B2 | 10/2003 | Huang et al. | |
| 7,106,030 B2 | 9/2006 | Isurin et al. | |
| 7,271,570 B2 | 9/2007 | O'Gorman et al. | |
| 7,283,899 B1 * | 10/2007 | Harmon et al. | 701/36 |
| 7,466,033 B2 * | 12/2008 | Witten et al. | 290/1 A |
| 2002/0163321 A1 * | 11/2002 | Harmon | 322/28 |
| 2003/0107351 A1 * | 6/2003 | Taniguchi et al. | 322/36 |
| 2003/0198065 A1 * | 10/2003 | Hayashi et al. | 363/35 |
| 2004/0262925 A1 * | 12/2004 | Seki et al. | 290/40 A |
| 2007/0210763 A1 * | 9/2007 | Aoyama | 322/28 |
| 2008/0084191 A1 * | 4/2008 | Harmon et al. | 322/28 |
| 2009/0058372 A1 * | 3/2009 | Tsuzuki | 322/18 |
| 2009/0322288 A1 * | 12/2009 | Merrill et al. | 320/153 |
| 2010/0231180 A1 * | 9/2010 | Harmon et al. | 322/28 |

* cited by examiner

*Primary Examiner* — Julio Gonzalez
(74) *Attorney, Agent, or Firm* — Maginot, Moore & Beck

(57) ABSTRACT

An alternator comprises a regulator configured to control the electric current to a field coil. The regulator includes a field driver circuit, the field driver circuit configured to deliver the electric current to the field coil at a switching frequency. The regulator further includes a controller configured to vary the switching frequency of the field driver circuit between a plurality of different switching frequencies. The alternator further comprises a sensor configured to detect a predetermined alternator condition, and the controller is configured to adjust the switching frequency of the field driver circuit in response to the sensed predetermined condition such as, for example, a rotor speed, a pulse width from the field driver circuit, an efficiency of the alternator, a temperature within the alternator, a temperature outside of the alternator, or magnetic noise of the alternator.

20 Claims, 4 Drawing Sheets

ALTERNATOR REGULATOR WITH VARIABLE ROTOR FIELD FREQUENCY

FIELD

This application relates to the field of vehicle electric systems and more particularly, to arrangements and methods for controlling a vehicle alternator.

BACKGROUND

Alternators are used to convert mechanical energy from a vehicle engine into electrical energy for the vehicle. The electrical energy produced by the alternator is used to charge the vehicle battery, and may also be used to power electric loads on the vehicle.

The alternator generally includes a rotatable field coil positioned within a stator having a plurality of stator windings. Operation of the engine results in rotation of the field coil. Current flowing through the rotating field coil provides a rotating magnetic field. This rotating magnetic field induces an AC output voltage in the stator windings. The AC voltage in the stator windings is rectified and delivered to the vehicle battery and/or electric loads on the vehicle.

Modern vehicle alternators include a regulator that controls the current through the field coil. In general, when more current is provided to the field coil, the output voltage of the alternator increases. When less current is provided to the field coil, the output voltage of the alternator decreases.

The modern motor vehicle engine compartment is increasingly cramped as manufacturers strive to reduce the size of vehicles, including the engine compartment. With multiple components packed in a relatively small space, the heat generated by multiple components increases the temperature within the engine compartment. Furthermore, the tightly packet engine compartment reduces the space available for cooling air to flow through the engine compartment and reduce component temperatures. Excessive engine compartment temperatures may adversely affect the performance of the components positioned in the engine compartment, including the alternator. Thus, as underhood temperatures continue to increase, new methods of reducing heat sources in the engine compartment are sought.

Vehicle alternators have traditionally utilized fixed frequency field drivers. In these alternators, a field driver circuit provides pulses of current to the field coil at a fixed frequency. However, this field driver circuit is one of the main sources of heat generated within the alternator. The heat generated by the field driver circuit is further intensified by the switching action of the field driver circuit. Because the field driver circuit is a significant source of heat, it would be advantageous to reduce the heat generated by the field driver circuit, and thus reducing the heat within the engine compartment.

In addition to the generation of heat, alternator switching may also result in magnetic noise. Magnetic noise may have adverse affects for the vehicle, including reduced efficiency of the alternator and audible noise. Thus, methods of reducing magnetic noise in an alternator are also desired.

SUMMARY

An alternator comprises a stator including a plurality of stator windings and a rotatable field coil positioned within the stator. The alternator further comprises a regulator configured to control the electric current to the field coil. The regulator includes a field driver circuit, the field driver circuit configured to deliver the electric current to the field coil at a switching frequency. The regulator further includes a controller configured to vary the switching frequency of the field driver circuit between a plurality of different switching frequencies.

In at least one embodiment, the alternator further comprises a sensor configured to detect a predetermined alternator condition, and the controller is configured to adjust the switching frequency of the field driver circuit in response to the sensed predetermined condition. The sensed predetermined condition may include at least one of a rotor speed, a pulse width from the field driver circuit, an efficiency of the alternator, a temperature within the alternator, a temperature outside of the alternator, or magnetic noise of the alternator.

In at least one embodiment, the controller is configured to vary the switching frequency of the field driver circuit between a plurality of different predetermined frequencies. In this embodiment, the controller is configured to change the switching frequency of the field driver circuit from a first predetermined frequency to a second predetermined frequency. In another embodiment, the plurality of different switching frequencies comprise a number of frequencies within a range of frequencies. In this embodiment, the controller changes the switching frequency of the field driver circuit from a first frequency within the range to a second frequency within the range.

In at least one embodiment, the field driver circuit comprises a MOSFET transistor configured to control the electric current delivered to the field coil. The MOSFET transistor is switchable between an on-state and an off-state at the switching frequency.

The above described features and advantages, as well as others, will become more readily apparent to those of ordinary skill in the art by reference to the following detailed description and accompanying drawings. While it would be desirable to provide an alternator that provides one or more of the foregoing or other advantageous features as may be apparent to those reviewing this disclosure, the teachings disclosed herein extend to those embodiments which fall within the scope of the appended claims, regardless of whether they accomplish one or more of the above-mentioned advantages.

DESCRIPTION

Figure 1:
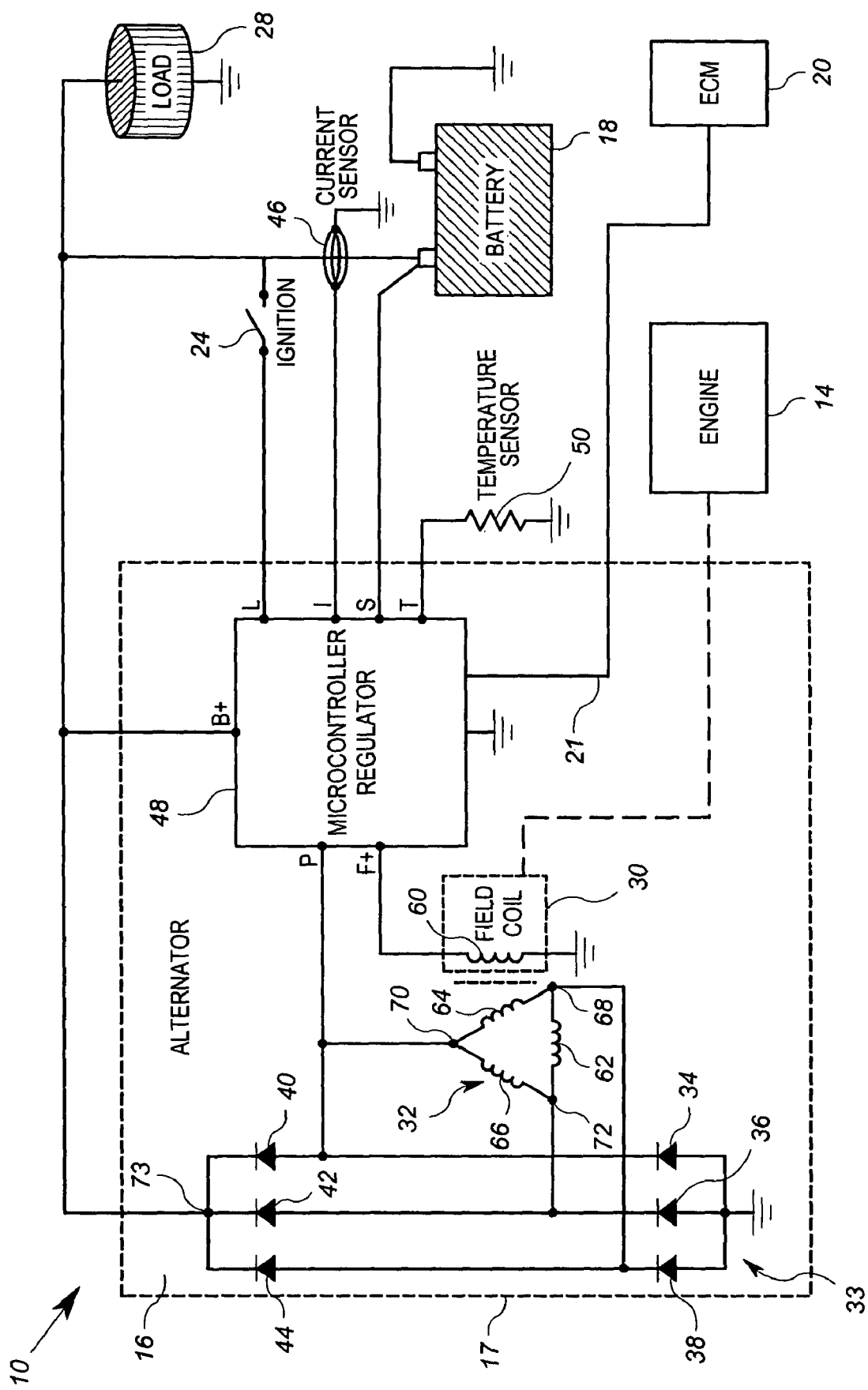
FIG. 1 is a block diagram of a vehicle having an engine and an alternator operable to provide a variable rotor field frequency.

Referring to FIG. 1, a vehicle 10 having a vehicle alternator 16 in accordance with an exemplary embodiment is illustrated. The vehicle 10 further includes an engine 14 and a battery 18 provided within a body and supported by a vehicle chassis.

The engine 14 provides a drive torque for moving the vehicle 10. The engine 14 is coupled to a rotor 30 of the alternator 16 such that operation of the engine 14 results in rotation of the rotor 30. In particular, when an ignition switch 24 is closed, electrical current from the battery 18 is delivered to a starter motor (not shown). When the starter motor is energized, it cranks the engine 14. When the engine 14 fires, the rotor 30 spins and the alternator 16 generates an output voltage at node 73. The output voltage of the alternator 16 is utilized to electrically charge the battery 18 and is also utilized by other electrical devices of the vehicle 10 as represented by the vehicle load 28.

With continued reference to FIG. 1, the alternator 16 includes the rotor 30, a stator 32, a rectifier 33, a current sensor 46, and a voltage regulator 48, all positioned within a housing 17. The housing 17 is typically a metal casing, such as a steel casing or a cast aluminum casing. However, it will be recognized that the housing 17 could also be comprised of any other suitable material.

The rotor 30 of the alternator 16 includes a field coil 60 that receives a signal from the regulator 48 having a predetermined duty cycle. The stator 32 is positioned around the rotor 30. The stator 32 generates an output current at node 73 having a magnitude that is based on the duty cycle of the signal applied to the field coil 60. The stator 32 includes phase coils 62, 64, 66 coupled in a Delta-configuration. In another exemplary embodiment, the phase coils 62, 64, 66 are coupled in a Y-configuration.

The stator 32 is electrically coupled to the rectifier 33, which delivers the alternator output at node 73. The rectifier 33 includes diodes 34, 36, 38, 40, 42, 44. In the embodiment of FIG. 1, the phase coil 64 is electrically coupled between node 70 and node 68. The phase coil 66 is electrically coupled between node 70 and node 72. The phase coil 62 is electrically coupled between node 72 and node 68. The diode 34 is electrically coupled between node 70 and electrical ground, the diode 36 is electrically coupled between node 72 and electrical ground, and the diode 38 is electrically coupled between node 68 and electrical ground. The diode 44 is electrically coupled between node 68 and node 73, the diode 42 is electrically coupled between node 72 and node 73, and the diode 40 is electrically coupled between node 70 and node 73.

Figure 2:
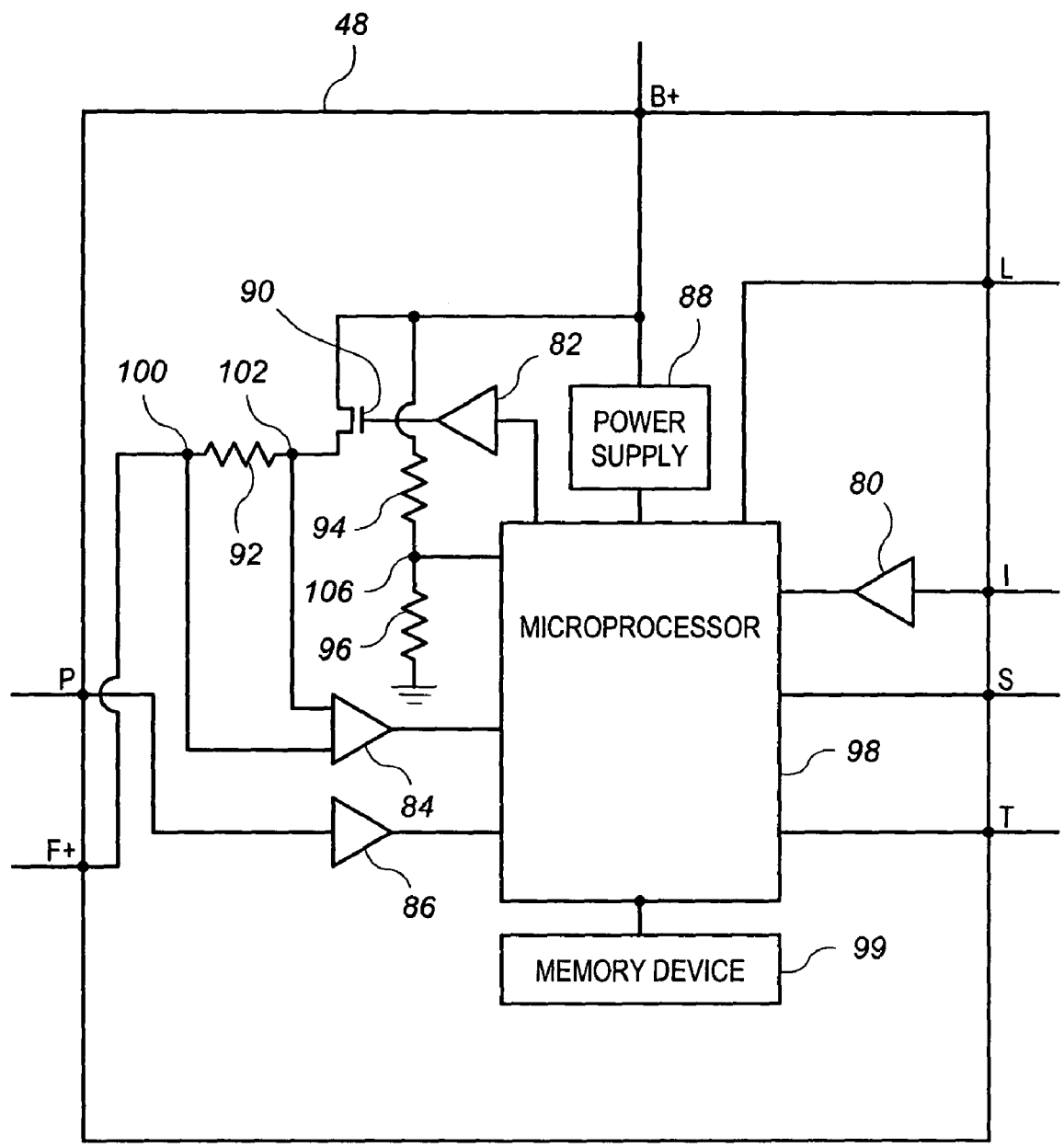
FIG. 2 is a block diagram of an exemplary internal regulator with a field driver circuit for use with the alternator of FIG. 1.

The current sensor 46 provides an output signal that is indicative of an amount of current flowing to/from the battery 18. As shown in FIG. 2, when the output signal from the current sensor is delivered to the regulator 48 it is passed through an amplifier 80. The amplifier 80 amplifies the signal from the current sensor 46 and sends the amplified signal to the microprocessor 98 of the regulator 48. The microprocessor 98 utilizes the amplified signal to determine the amount of current flowing to or from the battery 18.

The voltage regulator 48 is provided to control an output voltage and an output current being output by the stator 32. The regulator 48 is housed entirely within the housing 17 of the alternator 16 as shown in FIG. 1. However, in other embodiments, the regulator 48 may be positioned outside of the alternator housing 17.

FIG. 1 shows various inputs/outputs for the regulator 48. These inputs/outputs are designated as F+, P, B+, L, I, S and T. FIG. 1 also shows a ground connection for the regulator 48. The F+ output designates the regulator connection to the field coil 60. The P input designates the regulator connection to the stator windings. The B+ input designates the regulator connection to the battery 18. The L connection designates the regulator connection to the ignition switch 24. The I input designates the regulator connection to the current sensor 46, and this input provides an indication of the current flowing to or from the battery. The S input designates the external sense connection to the battery, and this input provides the correct voltage to the battery (i.e., eliminates resistance losses in the B+ to the battery line). The T input designates the regulator connection to the temperature sensor 50 which may be located within the alternator housing 17 or outside of the alternator housing.

With particular reference now to FIG. 2, the regulator 48 of the alternator 16 is shown, including various components, such as an internal microprocessor 98. It will be recognized that the microprocessor 98 and the various components of the regulator 48 may be provided together on a single chip/printed circuit board. Alternatively, the various components of the regulator 48 may be provided separately and wired to the microprocessor. The power supply 88 is electrically coupled between node 73 and a microprocessor 98.

As shown in FIG. 2, the various components of the regulator 48 include amplifiers 80, 82, 84, 86, a power supply 88, a transistor 90, resistors 92, 94, 96, a microprocessor 98, and a memory device 99. The power supply 88 is configured to provide an operational voltage to the microprocessor 98. The amplifier 82 and the transistor 90 provide the main components of a field driver circuit. The field driver circuit is controlled by the microprocessor 98 and is configured to control the field current provided to the field coil at output F+.

The amplifier 82 of the field driver circuit may be provided as a MOSFET with the output of the amplifier 82 connected to the gate of MOSFET. The amplifier 82 amplifies a control signal from the microprocessor 98 which is configured to control the transistor 90 by switching the transistor between an on-state and an off-state. Thus, the amplifier 82 includes circuitry required to drive the gate terminal of the transistor 90. The drain terminal of the transistor 90 is electrically coupled to node 73, and the source terminal of the transistor 90 is electrically coupled to node 102. A resistor 92 is electrically coupled between node 102 and node 100 which is electrically coupled to the field coil 60 of the rotor 30. During operation, the microprocessor 98 adjusts the control signal output to the amplifier 82 in order to switch the transistor 90 on and off. As explained in further detail below, by controlling transistor switching, the duty cycle and frequency of the field current output at F+ can be controlled.

As further illustrated in FIG. 2, the resistor 94 is electrically coupled between node 73 (at the B+ input) and node 106. The resistor 96 is electrically coupled between node 106 and electrical ground. In addition, node 106 is electrically coupled to the microprocessor 98. The microprocessor 98 monitors the voltage at node 106, thus providing feedback to the microprocessor concerning the output voltage of the stator 32.

With continued reference to FIG. 2, the amplifier 84 has first and second input terminals electrically coupled to nodes 100 and 102, respectively. Further, the amplifier 84 has an output terminal electrically coupled to the microprocessor 98. The microprocessor 98 monitors the signal output by the amplifier 84 to determine the field current received by the field coil 60. This input to the microprocessor 98 may also be used to detect a short circuit fault condition of the field coil 60.

The amplifier 86 is electrically coupled between node 70 and the microprocessor 98. The amplifier 86 amplifies a signal output at the stator node 70 and delivers it to the microprocessor 98. The microprocessor 98 is configured to determine a frequency of AC phase voltage of the stator 30 based on the amplified signal from the amplifier 86. Further, the microprocessor 98 is configured to determine a value indicative of the rotational speed of the rotor 30 based on the frequency of the AC phase voltage of the stator 32.

In addition to the microprocessor inputs described above, the microprocessor 98 also receives inputs from the current sensor 46 via amplifier 80, the battery 18, the ignition switch 24, and the temperature sensor 50. A memory device 99 is also connected to the microprocessor 98. The memory device 99 is configured to store computer executable instructions utilized by the microprocessor 98 and associated data for implementing methods that will be described in further detail below.

Figure 3A:
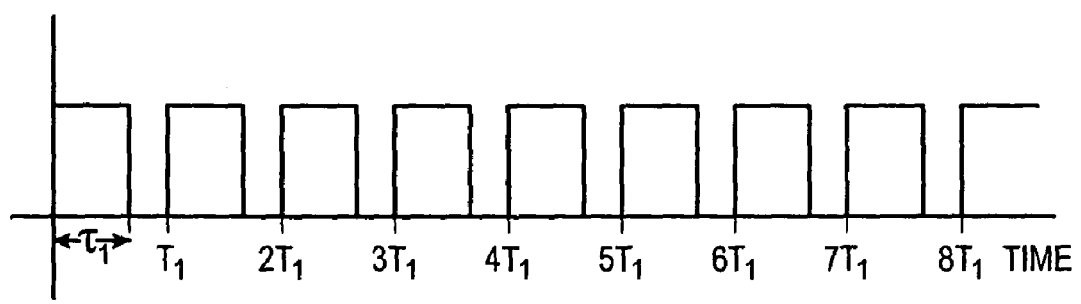
FIG. 3 is a grid showing an exemplary switching frequency for the field driver circuit of FIG. 2.

The microprocessor/controller 98 monitors various alternator and vehicle conditions and controls operation of the voltage regulator 48 depending on these conditions. In particular, the microprocessor 98 controls the field current output by the regulator 48 by delivering control signals to the gate of the transistor 90. These control signals switch the transistor 90 on and off such that the field current is provided as a pulse signal, such as that shown in FIG. 3A. In FIG. 3A, the pulse duration of the field current is shown as $\tau_1$ and the period of the pulse is shown as $T_1$, with the duty cycle (D) calculated as $D=\tau_1/T_1$. Depending on the inputs received, the microprocessor 98 may adjust the duty cycle D in an attempt to control alternator output by increasing or decreasing the pulse duration $\tau$.

Figure 3B:
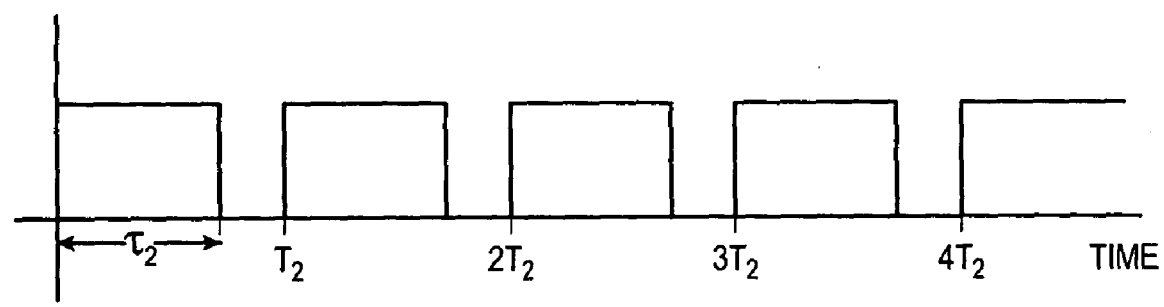

In addition to adjusting the pulse duration $\tau$ in an attempt to control alternator output, the alternator disclosed herein is further configured to adjust the frequency of the pulse in the field current in order to control the alternator output. The signal shown in FIG. 3B shows a field current on the same scale as that of FIG. 3A, with the pulse duration in FIG. 3B shown as $\tau_2$ and the period shown as T2. However, in FIG. 3B, the switching frequency of the transistor 90 has been halved in order to decrease the frequency of the field current. By decreasing the frequency of the field current, the switching frequency of the field driver circuit may also be decreased. This results in a decrease in the production of heat with the field current of FIG. 3B compared to that of FIG. 3A, since the switching frequency of the transistor 90 is reduced in FIG. 3B.

It will be noted that a change in switching frequency of the field driver circuit does not necessarily translate into a change in the duty cycle of the field current. For example, the duty cycle of the signal in FIG. 3B is the same as that in FIG. 3B, but the frequency and duration of each pulse has been halved ($T_2=2T_1$ and $\tau_2=2\tau_1$). Of course, FIGS. 3A and 3B are merely shown for illustrative purposes, and the microcontroller 98 may be configured to adjust the duty cycle and switching frequency of the field current in any manner appropriate to achieve the desired alternator output in response to various engine and alternator conditions.

In order to detect various alternator conditions and/or vehicle engine conditions, the alternator is configured to receive inputs from one or more sensors. These sensors are configured to detect predetermined alternator conditions and the controller is configured to adjust the switching frequency of the field driver circuit in response to the sensed predetermined condition. For example, as shown in FIG. 1, temperature sensor 50 may be used to deliver a signal to the alternator indicative of an internal alternator operating temperature. If the sensed internal alternator operating temperature exceeds a predetermined threshold amount, the microcontroller 98 may drive the field driver circuit at a reduced switching frequency. Temperature is but one such parameter that the alternator may be configured to monitor. Other examples of sensed parameters/predetermined conditions include rotor speed, pulse width from the field driver circuit, efficiency of the alternator, a temperature outside of the alternator, or magnetic noise of the alternator.

The controller 98 may be configured to vary the switching frequency of the field driver circuit between a limited number of predetermined switching frequencies or between any of numerous switching frequencies within a certain range. For example, in a first embodiment, the controller is programmed to vary the switching frequency between a first frequency, a second frequency or a third frequency, depending on the alternator inputs. In this embodiment, the controller is configured to change the switching frequency of the field driver circuit from the first predetermined frequency to the second predetermined frequency when the a certain vehicle condition exists (or a combination of vehicle conditions exist), such as alternator temperature in excess of a predetermined threshold.

In a second embodiment, the controller 98 is programmed to vary the switching frequency of the field driver circuit between any number of different switching frequencies within a range of frequencies. In this embodiment, the controller is configured to change the switching frequency of the field driver circuit from a first frequency within the range to a second frequency within the range, but the change in frequency is not limited to a certain incremental change or a limited number of frequencies within the range. Thus, if the controller 98 detects that an internal operating temperature of the alternator is reaching a threshold a relatively small change in the switching frequency may be made in an attempt to reduce the operating temperature which may then be followed by a larger change in the switching frequency, if necessary As mentioned previously, the memory device 99 includes a plurality of different field current control programs that may be executed by the microprocessor 98. Each of the plurality of different programs is configured to provide an optimal field current through the field coil of the alternator, based at least in part on one or more vehicle operating parameters.

Figure 4:
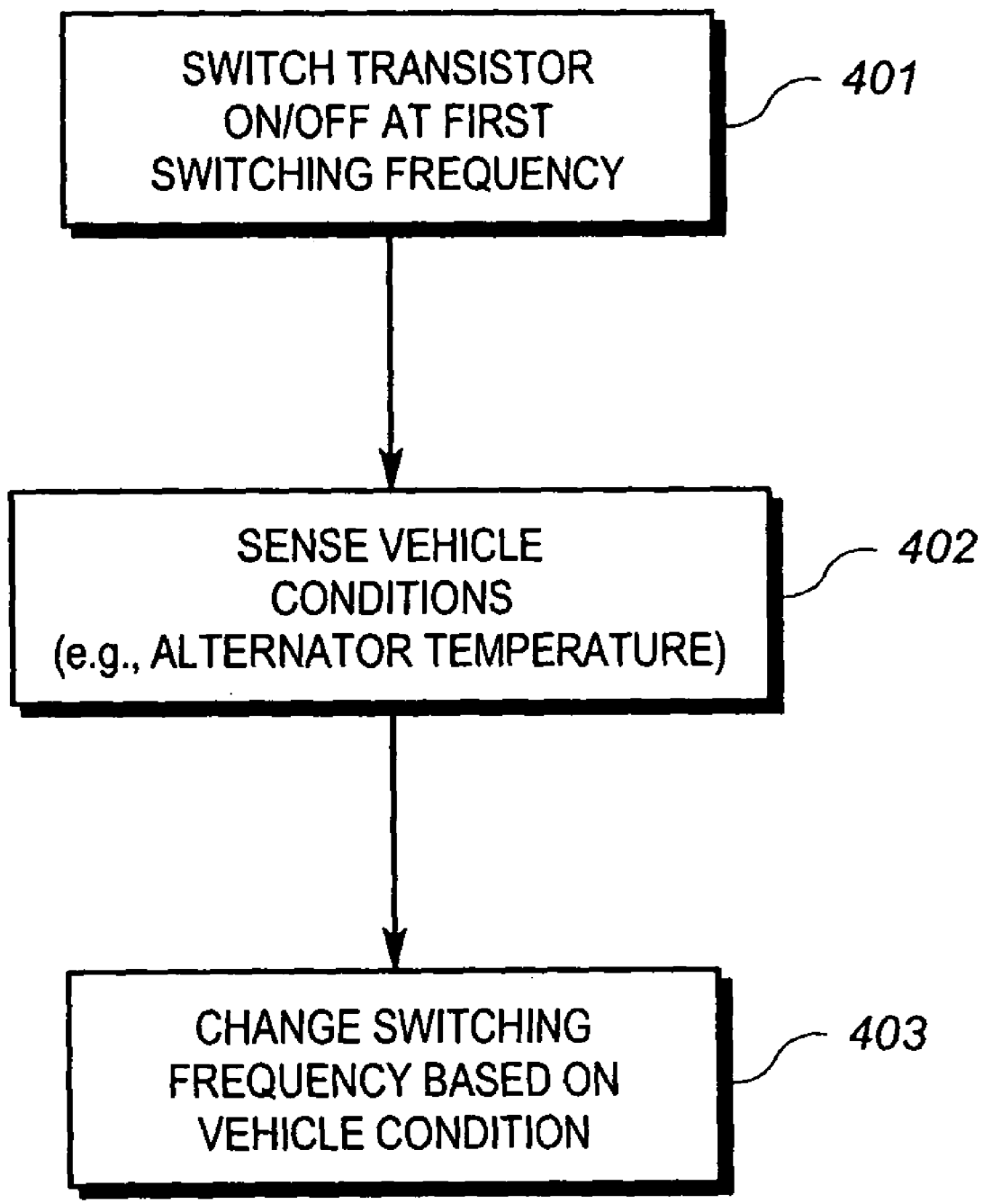
FIG. 4 is a flow chart showing a method of operating the alternator regulator of FIG. 1.

An exemplary method of operating an alternator regulator with a variable field frequency is shown in FIG. 4. In step 401, the regulator drives the field driver circuit at a first switching frequency such that the field current is provided at this first switching frequency. In step 402, the regulator senses that a vehicle condition, such as for example, alternator internal temperature has exceeded a predetermined threshold. At step 403, the microprocessor determines a desired switching frequency based on the changed vehicle condition, the desired switching frequency being different from the first switching frequency. The regulator then sends a control signal to drive the field driver circuit at the desired switching frequency such that the field current is provided at this second switching frequency. The alternator may determine the desired switching frequency in any of numerous ways, such as through a lookup table, or an algorithm that considers various vehicle parameters and provides a desired switching frequency (and duty ratio) based on these parameters.

In at least one alternative embodiment, the vehicle 10 further includes an engine control module 20 (ECM). The engine control module 20 is provided to control operation of the engine 14. The engine control module 20 operably communicates with the engine 14 and the alternator 16 via a communication bus 21. The communication bus is utilized to send and receive data between the ECM 20 and the alternator 16. When the ECM is used, various types of data that would otherwise be sent directly to the microprocessor 98 may first be routed through the ECM and then passed on to the microprocessor through the ECM connection. For example, signals from the current sensor 46 and the temperature sensor 50 may be provided via the ECM 20. MP regulator sense may also be monitored by the ECM and communicated to the regulator, if desired.

While the invention has been described with reference to exemplary embodiments, it will be understood by those skilled in the art that other implementations and adaptations are possible. For example, various changes may be made and equivalent elements may be substituted for elements thereof without departing from the scope of the invention. Furthermore, the alternator may be configured with additional or less inputs to the regulator and remain operational. For example, the current sensor 46 and/or temperature sensor 50 inputs described above could be completely removed from the regulator, while still allowing operation of the regulator. In addition to the foregoing examples, many modifications may be made to adapt a particular situation or material to the teachings of the invention without departing from the essential scope thereof. Also, there are advantages to individual advancements described herein that may be obtained without incorporating other aspects described herein. Therefore, it is intended that the invention not be limited to the particular embodiment disclosed for carrying out this invention, but that the invention will include all embodiments falling within the scope of the appended claims.

What is claimed is:

1. An alternator comprising:
a stator including a plurality of stator windings;
a rotatable field coil positioned within the stator;
a field driver circuit, the field driver circuit configured to deliver an electric current to the field coil at a switching frequency; and
a controller configured to vary the switching frequency of the field driver circuit between a plurality of different switching frequencies such that the electric current to the field coil is varied between the plurality of different switching frequencies, wherein the plurality of different switching frequencies comprise frequencies within a range of frequencies, and wherein the controller is configured to change the switching frequency of the field driver circuit from a first frequency within the range to a second frequency within the range when the controller varies the switching frequency of the field driver circuit, the first frequency being different from the second frequency.

2. The alternator of claim 1 further comprising a sensor configured to detect a predetermined alternator condition, wherein the controller is configured to adjust the switching frequency of the field driver circuit in response to the sensed predetermined condition.

3. The alternator of claim 2 wherein the sensed predetermined condition comprises at least one of a rotor speed, a pulse width from the field driver circuit, an efficiency of the alternator, a temperature within the alternator, a temperature outside of the alternator, or magnetic noise of the alternator.

4. The alternator of claim 1 wherein the plurality of different switching frequencies comprises a plurality of predetermined frequencies, and wherein the controller changes the switching frequency of the field driver circuit from a first predetermined frequency to a second predetermined frequency when the controller varies the switching frequency of the driver circuit, the first switching frequency being different from the second predetermined frequency.

5. The alternator of claim 1 wherein the field driver circuit comprises a MOSFET transistor configured to control the electric current delivered to the field coil, wherein the MOSFET is switchable between an on-state and an off-state at the switching frequency.

6. The alternator of claim 1 wherein the field driver circuit and the controller are provided within a regulator.

7. A method of operating an alternator in a vehicle, the method comprising:
a) delivering a field current to a rotatable field winding at a field current frequency;
b) controlling the field current using a transistor, wherein controlling the field current comprises switching the transistor between an on-state and an off-state at a switching frequency;
c) determining a vehicle operating parameter; and
d) adjusting the switching frequency of the transistor based on the determined vehicle operating parameter such that the field current frequency is also adjusted, wherein adjusting the switching frequency of the transistor comprises changing the switching frequency from a first switching frequency within a predetermined range of switching frequencies to a second switching frequency within the predetermined range of switching frequencies.

8. The method of claim 7 wherein the transistor is provided as part of a field driver circuit.

9. The method of claim 7 wherein adjusting the switching frequency of the transistor comprises changing the switching frequency from a first of a plurality of predetermined switching frequencies to a second of the plurality of predetermined switching frequencies.

10. The method of claim 7 wherein the determined vehicle operating parameter comprises at least one of a rotor speed, a pulse width of the field current, an efficiency of the alternator, a temperature within the alternator, a vehicle temperature outside of the alternator, or magnetic noise of the alternator.

11. The method of claim 7 wherein determining a vehicle operating parameter comprises receiving a signal from a vehicle sensor configured to sense the vehicle operating parameter.

12. The method of claim 7 further comprising adjusting a duty cycle of the transistor based on the determined vehicle operating parameter.

13. A regulator for a vehicle alternator, the regulator comprising:
a direct current input;
an output;
a field driver circuit configured to provide a field current to the output at a switching frequency; and
a controller configured to vary the switching frequency of the field driver circuit and the field current to the output between a plurality of different switching frequencies such that the field current to the output is varied between the plurality of different switching frequencies, wherein the plurality of different switching frequencies comprise frequencies within a range of frequencies, and wherein the controller is configured to change the switching frequency of the field driver circuit from a first frequency within the range of frequencies to a second frequency within the range of frequencies when the controller varies the switching frequency of the driver circuit, the first frequency being different from the second frequency.

14. The regulator of claim 13 wherein the field driver circuit includes a transistor operable between an on state and an off state at the switching frequency.

15. The regulator of claim 14 wherein the plurality of different switching frequencies comprise a plurality of predetermined switching frequencies within the range of switching frequencies.

16. The regulator of claim 14 wherein the controller is configured to vary the switching frequency in response to a determined vehicle condition.

17. The regulator of claim 16 wherein the determined vehicle condition comprises at least one of a rotor speed, a pulse width from the field driver circuit, an efficiency of the alternator, a temperature within the alternator, a temperature outside of the alternator, or magnetic noise of the alternator.

18. The regulator of claim 14 wherein the controller is further configured to vary a duty cycle of the transistor.

19. The regulator of claim 16 wherein the determined vehicle condition is provided by a signal from a sensor that is separate from the regulator.

20. The alternator of claim 13 wherein the field driver circuit comprises a MOSFET transistor configured to control the electric current delivered to the field coil, wherein the MOSFET is switchable between an on-state and an off-state at the switching frequency.

* * * * *